United States Patent [19]

Fehrenbach et al.

[11] Patent Number: 4,497,437
[45] Date of Patent: Feb. 5, 1985

[54] CONTROL DEVICE WITH A BIMETALLIC ELEMENT UNILATERALLY FASTENED IN A HOUSING

[75] Inventors: Siegfried Fehrenbach, Markgröningen; Kurt Herbst, Burgstetten; Eberhard Utz, Stuttgart, all of Fed. Rep. of Germany

[73] Assignee: Robert Bosch GmbH, Stuttgart, Fed. Rep. of Germany

[21] Appl. No.: 415,945

[22] Filed: Sep. 8, 1982

[30] Foreign Application Priority Data

Mar. 6, 1982 [DE] Fed. Rep. of Germany ....... 3208107

[51] Int. Cl.³ .......................................... G05D 23/19
[52] U.S. Cl. ................. 236/68 B; 267/54 R; 267/158; 236/101 E; 403/365
[58] Field of Search ............. 236/101 E, 68 B; 337/112, 372, 380; 403/365, 366; 267/54 R, 158

[56] References Cited

U.S. PATENT DOCUMENTS

| | | | |
|---|---|---|---|
| 1,837,023 | 12/1931 | Derr | 236/101 E X |
| 2,405,767 | 8/1946 | Sprague | 337/380 X |
| 2,494,079 | 1/1950 | Andrews | 236/101 E |
| 2,510,644 | 6/1950 | McCormick | 403/365 X |
| 2,891,127 | 6/1959 | Tramontini | 337/380 X |
| 2,973,419 | 2/1961 | Bolesky et al. | 337/380 X |
| 3,595,475 | 7/1971 | Morton | 236/101 E X |
| 4,234,217 | 2/1981 | Glöcker . | |
| 4,294,217 | 10/1981 | Glöcker | 123/491 |

FOREIGN PATENT DOCUMENTS 6471 of 1909 United Kingdom ................ 337/380

Primary Examiner—William E. Tapolcai
Attorney, Agent, or Firm—Edwin E. Greigg

[57] ABSTRACT

A control device is proposed having a bimetallic element, one end of which is pressed into a holding groove provided on a metallic holder disposed in a housing. Fixed placement of bimetallic element over the lifetime of the control device is thus ensured. A method of making such a device is also proposed.

4 Claims, 4 Drawing Figures

CONTROL DEVICE WITH A BIMETALLIC ELEMENT UNILATERALLY FASTENED IN A HOUSING

BACKGROUND OF THE INVENTION

The invention is directed to a control device for a supplementary air valve operative in accordance with temperature and time. A control device is disclosed in U.S. Pat. No. 4,294,217 in which a bimetallic element is disposed within a housing in a socket of die-cast plastic. This construction has the disadvantage that plastic tends to deteriorate with time, which can lead to an unplanned shift in the position of the bimetallic element within the housing, resulting in a potential for change in the behavior of the control device.

OBJECT AND SUMMARY OF THE INVENTION

It is a principal object of the invention to provide a control device which has the advantage over the prior art that a positional change of the bimetallic element is prevented during the life of the control device.

The invention will be better understood and further objects and advantages thereof will become more apparent from the ensuing detailed description of the preferred embodiment taken in conjunction with the drawings.

BRIEF DESCRIPTION OF THE DRAWINGS

A preferred embodiment of the present invention is shown in the drawings in simplified form and further explained in the ensuing description.

DESCRIPTION OF A PREFERRED EMBODIMENT

Figure 1:
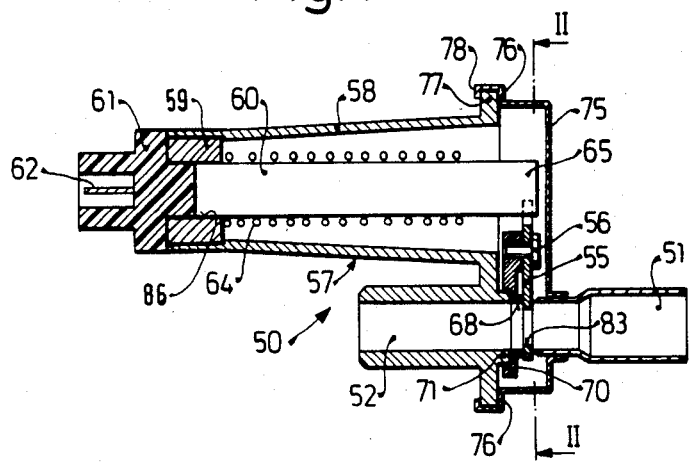
FIG. 1 is a cross-sectional view of a control device for a supplementary air valve in accordance with the present invention.
Figure 2:
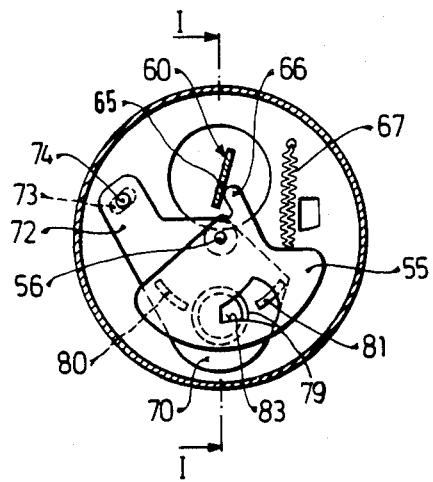
FIG. 2 is a section along line II—II of FIG. 1.

FIGS. 1 and 2 show a preferred embodiment of a control device for a supplemental air valve 50, which guides air around a throttle valve, not shown, of the intake pipe of an internal combustion engine in accordance with temperature and time all of which will be understood by referring to the patent mentioned supra. The supplementary air valve 50 has a flat vane 55 serving as a slide element, which is pivotably disposed about an eccentrically placed axis embodied as a pivot pin 56, and which, during its pivotal movement more or less uncovers or covers the inside diameter of the two air tubes 51 and 52, which are disposed coaxially with respect to one another, but in a spaced-apart relationship from each other as shown in FIG. 1. The air tube 52, which can be connected to the intake manifold by means of a rubber hose (not shown), is integrally connected with a metal housing 57 having an elongated tapering collar 58.

A longitudinally extended bimetallic spring 60 is disposed in the collar 58 by means of a holder 59. The holder 59 is pressed into the collar 58 and capped abuttingly by a plastic plug 61 extending exteriorly of the collar 58. The plug 61 contains prongs 62 only one of which is shown in FIG. 1. The prongs 62 are connected with the coil ends of a heating coil 64, which at least partially surrounds the bimetallic spring 60. The free end 65 of the bimetallic spring 60 contacts a short lever arm 66 which is formed into the vane 55 during stamping (see FIG. 2). The vane 55 is pivoted in a counter-clockwise direction by a tension spring 67 to such an extent that the lever arm 66 contacts the bimetallic spring 60.

In order to set the size of the flow-through cross section, a bearing plate 70 is provided, which is rotatably disposed on a collar 71 concentric to the air tube 52. This bearing plate 70 supports the pivot pin 56 for the vane 55, which pivot pin 56 is pressed into the bearing plate 70. The bearing plate 70 has a laterally extending integral lever 72 formed thereon which includes a slotted bore 73, through which a locking screw 74 extends. When this screw is loosened, the bearing plate can be pivoted about to the extent of the slotted bore and then fixed through tightening the screw. In this fashion a simple setting and controlling capability for the vane 55 and the bimetallic spring 60 is provided. The supplementary air valve has a housing cover 75 into which the air tube 51 is inserted. The housing cover 75 is supported on its outer edge by means of a shoulder 76 on the flange-like rim 77 of the housing 57 and is fastened thereon via a flanged zone 78. The mass of vane 55 and bimetallic spring 60 are substantially balanced or equalized with respect to the pivot pin 56.

In order to avoid a lateral tipping of the vane 55, two arcuate guide ribs 80 and 81, shown by dotted lines in FIG. 2, are provided.

The flow-through cross section between the two air tubes 51 and 52 is determined by the contour of a window 83 which is stamped out of the vane 55 to provide a configuration substantially as shown in FIG. 2. The window in the vane 55 is disposed in such a way that when the heating of the bimetallic spring 60 is turned off and low temperatures prevail, the window is arranged to lie across the inside diameter of both air tubes 51 and 52. However, with increased warming and rotation of the bimetallic spring about its axis, the window pivots away from lever arm 66 causing the vane 55 to rotate and reduce the quantity of air flowing through the window 83. It is to be understood that the shape of the window and its path of travel past the confronting surfaces of air tubes 51 and 52 is finely adjustable so that the pivot angle of the vane 55 may not only be varied depending upon the type of internal combustion engines, but it can be very precisely determined for all internal combustion engines of the same type and, furthermore, may be adjusted to precise supplementary air quantities by means of the bearing plate 70.

Figure 3:
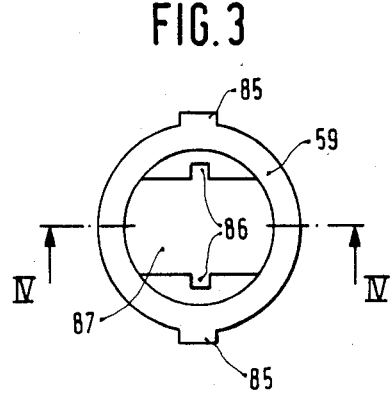
FIG. 3 is an elevational view of a support for the bimetallic element in accordance with the invention.
Figure 4:
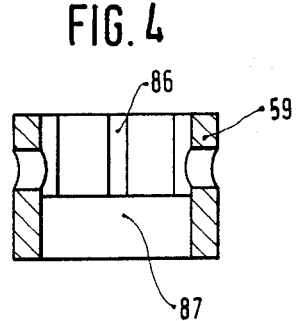
FIG. 4 is a section along line IV—IV of FIG. 3.

In FIGS. 3 and 4 the holder 59 has been shown separately. The holder 59 is advantageously of metal and formed as a ring with one or more guide bars 85, extending axially from the circumference of the ring to secure the holder 59 in the plug 61 within the collar 58 against twisting. The bimetallic spring 60 is inserted into oppositely disposed holding grooves 86 of the holder 59 which grooves extend axially of the holder 59. The holder 59 is also provided with a passage 87, towards which the holding grooves 86 open. The passage 87 encompasses the bimetallic spring 60 when the latter is pressed into the holding grooves 86 and then the assembled unit is injected with plastic, to create the plug 61. The electrical connections from the prongs 62 to the heating coil 64 are advantageously passed through the passage 87 of the holder 59 before injecting the plastic to be sheathed by the latter when the plastic is injected. Disposing the bimetallic spring 60 in the metallic holder 59 ensures exact placement of the bimetallic spring over the lifetime of the supplementary air valve 50 irrespective of what happens to the plastic. Such emplacement of the bimetallic element is not restricted to the exemplary embodiment described, but can also be used with other units.

The foregoing relates to a preferred exemplary embodiment of the invention, it being undersood that other embodiments and variants thereof are possible within the spirit and scope of the invention, the latter being defined by the appended claims.

What is claimed and desired to be secured by Letters Patent of the United States is:

1. In a control device provided with a bimetallic element disposed axially in a metal housing, the improvement comprising:
   a metallic holder in one end of said housing,
   said metallic holder having at least one passage extending axially thereof,
   oppositely disposed axially extending holding grooves in said metallic holder which opens toward said at least one passage,
   one end of said bimetallic element is positively disposed in said oppositely disposed axially extending holding grooves, so that said at least one passage partially encompasses said bimetallic element and
   a plastic filling filling said at least one passage in said metallic holder which secures said one end of said bimetallic element in said metallic holder.

2. In a control device as claimed in claim 1 wherein said plastic filling includes an electrical plug with electrical conductors that are imbedded in said plastic filling and which connect with a heater wire surrounding said bimetallic element.

3. In a control device in accordance with claim 1, the improvement further comprising the metallic holder includes a metal ring.

4. In a control device in accordance with claim 3, the improvement further comprising said ring includes a circumference on which at least one axially extending guide bar is provided.

* * * * *